Nov. 26, 1929.    J. H. SHEATS    1,736,984
THERMOSTATIC CARTRIDGE
Filed Sept. 17, 1928
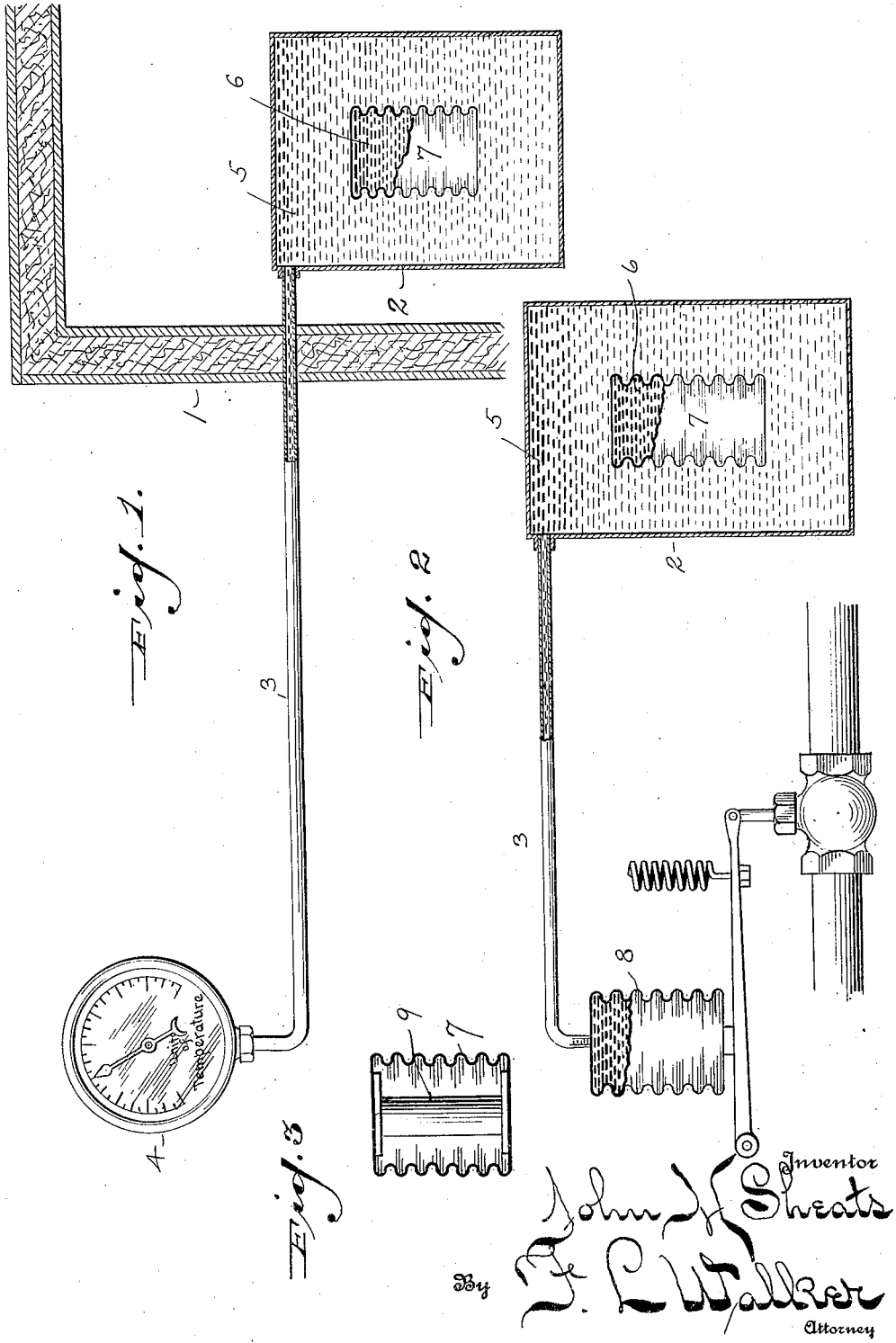

Patented Nov. 26, 1929

1,736,984

UNITED STATES PATENT OFFICE

JOHN H. SHEATS, OF DAYTON, OHIO

THERMOSTATIC CARTRIDGE

Application filed September 17, 1928. Serial No. 306,351.

My invention relates to thermostatic control of distantly operated apparatus, and particularly to the use of an expansible and contractible thermosensitive cartridge immersed in a body of substantially inert fluid unresponsive to thermatic changes, the pressure of which is varied by the expansion and contraction of the cartridge to actuate a distantly located pressure operated mechanism.

The invention is applicable to the automatic regulation of furnaces, the starting and stopping of refrigerator apparatus, the operation of a vehicle dash gage for indication of engine temperature, the automatic adjustment of valves, switches, and the like.

While fluid pressure operated devices have heretofore been employed for such purposes, they have been subject to inaccuracies and necessitated delicate compensating devices and frequent regulation and accurate adjustment to compensate for the expansion and contraction of the fluid in the transmission line outside the thermal chamber in which the primary temperature fluctuations occur.

The present construction affords means by which the influence of temperature changes within a given chamber may be transmitted to a distant gage or operating mechanism without being subject to disturbance or modifying influence of external temperatures to which the transmission line may be subject intermediate the thermal chamber and the indicator or operated device. Moreover, the arrangement is such that the gage or operated device is not subject to violent agitation by sudden fluctuations of temperature, but the operation is automatically governed to respond uniformly and slowly but accurately to the trend of temperature change.

To this end a sealed expansible and contractible vessel, preferably, though not necessarily, of the bellows type, filled with a thermosensitive gas or liquid such as sulphur dioxide, ether, mercury, alcohol or the like, is immersed in a body of thermally inert fluid which may be mineral oil or other substantially incompressible material, which is confined in a second vessel or chamber located in the thermal chamber and from which a conduit filled with such medium leads to the distantly located pressure operated device. The expansion and contraction of the sealed vessel containing the body of thermosensitive medium by displacement of the inert medium causes a variation of pressure which is transmitted through the medium filled conduit to the distantly located gage or operated mechanism.

The object of the invention is to simplify the structure as well as the means and mode of operation of distantly operated thermally controlled apparatus, whereby they will not only be cheapened in construction, but will be more efficient in use, positive in operation, uniform in action, entirely automatic, and unlikely to get out of repair.

A further object of the invention is to provide improved thermal control means which will not be subject to influence of temperatures externally of the chamber in which the primary apparatus is located and which will therefore not necessitate the provision of compensating regulating and adjusting means to compensate for the influence of temperature upon the transmission conduit leading to the distantly located instrument.

A further object of the invention is to provide a thermal control apparatus, which while accurate in its operation and sensitive to change of temperature, will not be subject to sudden fluctuations and will not induce vibration or the alternating movement of the operated devices.

A further object of the invention is to provide as an article of manufacture a thermally tested cartridge for use in conjunction with pressure operated devices for effecting change of pressure of an actuating medium in accordance with fluctuations of temperature.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings, wherein is shown the preferred, but obviously not necessarily, the only form of embodiment of the invention, Fig. 1 is a sectional view somewhat diagrammatic illustrating the application of the present invention to the operation of a distantly located gage. Fig. 2 is a similar view showing the application of the present invention to the operation of a valve, a switch or the like, located at a distant point. Fig. 3 is a detail sectional view of a modification of the thermal cartridge.

Similar characters of reference are used to denote like parts throughout the drawings.

In the accompanying drawings, 1 indicates a chamber which may be a refrigerator compartment or a room in a residence, the temperature of which is to be indicated at a distant point, or is to determine the operation of a distantly located mechanism, such as a furnace regulator, an electric switch, for valve operating mechanism. Located within the chamber 1 is a vessel 2 from which leads a conduit 3 to the distantly located indicator or gage 4, or other device. The vessel 2 and its communicating transmission conduit 3 are completely filled with an inert fluid or liquid which is substantially unresponsive to temperature changes and possesses a minimum factor of expansion and contraction. Submerged within the vessel 2 is a sealed cartridge 7 which is capable of expansion and contraction and which contains a body of medium sensitive to thermal change and possessing a maximum factor of expansion and contraction.

The preferable material or inert liquid contained within the vessel 2 is a mineral oil having a very low congealing point while the thermally sensitive medium with which the cartridge 7 is filled is preferably ether, sulphur dioxide gas, alcohol or mercury. The cartridge 7 may be of any suitable construction whereby it is capable of expanding and contracting in unison with expansion and contraction of its contents. This cartridge may be made of elastic material or comprise relatively adjustable sections, but the preferable construction is that of a bellows type of chamber having reverse peripheral pleats known generally in the trade as a "sylphon." The inert filling medium 5 within the vessel 2 tends to somewhat protect the more sensitive medium 6 within the cartridge 7 against sudden fluctuations of temperature within the chamber 1. However, as the temperature of the chamber 1 changes the thermally sensitive charge 6 with the cartridge 7 expands or contracts in accordance wtih such temperature change. The expansion of this cartridge by displacement of the medium 5 increases its pressure within the vessel 2 and conduit 3, which pressure increase is transmitted to the distantly located gage. As the cartridge contracts upon decrease of temperature within the chamber or room 1, such pressure is relieved within the vessel 2 and conduit 3 and the decrease of temperature is correspondingly indicated upon the distant gage.

In Fig. 2 there has been shown a second expansible and contractible bellows member or "sylphon" 8 with which the conduit 3 communicates in lieu of the gage shown in Fig. 1. This bellows member or "sylphon" 8 by its expansion or contraction tends to open and close a valve, operate an electric switch or perform mechanical action.

In Fig. 3 there is shown a modification of the thermally sensitive cartridge, wherein a body 9 of expansible and contractible material other than a liquid may be employed. As shown this body consists of a helix of metallic wire having a large factor of expansion and contraction. Obviously the member 9 may consist of a bar or other shaped body of material. Such expansible and contractible member is connected at its opposite ends to the head of the cartridge 7, whereby the size of the cartridge is caused to change with the expansion and contraction of the enclosed member.

From the above description it will be apparent that there is thus provided a device of the character described, possessing the particular features of advantage before enumerated as desirable, but which obviously is susceptible of modification in its form, proportions, and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a thermostatic control device, a confined fluid body having a minimum factor of expansion and contraction under thermal change, and an expansible sealed cartridge submerged therein and containing a body susceptible to thermal change and having a greater factor of expansion and contraction, and adapted by its expansion to displace said first mentioned fluid body and a member operated by the displacement of said fluid body.

2. In a thermostatic control device, a fluid pressure operated device, a body of inert actuating fluid therefor, and a sealed expansible and contractible vessel submerged in said body of inert actuating fluid, and a body of thermally responsive material having a factor of expansion and contraction greater than said actuating fluid contained in said submerged vessel.

3. The combination with a fluid pressure operated mechanism, of a body of inert actuating fluid therefor, and a sealed bellows like vessel capable of expansion and contraction surrounded by said body of inert actuating fluid, and thermally responsive means contained therein for expanding and contracting the vessel.

4. The combination with a fluid pressure operated mechanism, of a body of inert actuating fluid therefor, and an expansible and contractible body of thermally responsive material submerged in said body of inert actuating fluid and by its expansion and contraction varying the pressure thereof upon said mechanism.

5. The combination with a fluid pressure operated mechanism, of a body of inert actuating fluid therefor, and a sealed cartridge of thermally responsive material submerged in said body of actuating fluid and subject to expansion and contraction by temperature change, thereby varying the pressure of said actuating fluid upon the operated mechanism.

6. In a temperature controlled apparatus, a sealed expansible and contractible vessel, a body of thermosensitive fluid therein having a high factor of expansion and contraction, a second fluid body substantially unresponsive to thermatic change in which the sealed vessel of thermosensitive fluid is immersed, and by the relative expansion and contraction of which, change of pressure of said second fluid body is induced, and a pressure operated mechanism controlled by fluctuations of pressure of said second fluid body.

In testimony whereof, I have hereunto set my hand this 17th day of September, A. D. 1928.

JOHN H. SHEATS.